United States Patent [19]

Foley

[11] Patent Number: 5,054,625
[45] Date of Patent: Oct. 8, 1991

[54] BAT RACK

[76] Inventor: Kevin M. Foley, 20 Manor Rd., St. Catharines, Ontario, Canada, L2N 3B5

[21] Appl. No.: 541,754

[22] Filed: Jun. 21, 1990

[30] Foreign Application Priority Data

Apr. 9, 1990 [CA] Canada .................................. 2014206

[51] Int. Cl.⁵ .............................................. A47F 7/00
[52] U.S. Cl. ..................................... 211/13; 211/60.1
[58] Field of Search ................ 211/13, 60.1, 128; 280/79.3

[56] References Cited

U.S. PATENT DOCUMENTS

| 159,960 | 9/1950 | Davey | 211/13 X |
|---|---|---|---|
| 2,634,189 | 4/1953 | Hill | 211/13 X |
| 3,650,407 | 3/1972 | Benham, Jr. | 211/87 X |
| 4,049,126 | 9/1977 | Halverson | 211/60.1 X |
| 4,227,710 | 10/1980 | Laub | 211/60.1 X |
| 4,469,341 | 9/1984 | Creim | 211/60.1 X |
| 4,561,547 | 12/1985 | Estwanik, III | 211/13 X |
| 4,583,647 | 4/1986 | Schinging | 211/60.1 |
| 4,807,763 | 2/1989 | Jankousky | 211/13 X |

Primary Examiner—Carl D. Friedman
Assistant Examiner—Sarah A. Lechok
Attorney, Agent, or Firm—Mitches & Co.

[57] ABSTRACT

A portable bat rack is generally shaped in the form of an equilateral triangle with larger sides of the triangular subtending the front and back of the rack while the smallest side subtends the bottom of the rack. The rack is closed at bottom and back and along the sides and carries three laterally disposed shelves, the lowest shelf being no greater than one half the width the other two shelves, the other two shelves relatively disposed above the smallest shelf and defining a plurality of bat accommodating apertures, preferably in an array of two parallel rows, a forward and rearward row. The rearward row of openings allows bats placed therethrough to rest on the smallest shelf while the forward row of openings allows the bats to rest on the bottom. The rack includes a pair of wheels and handle means whereby it may be, on the one hand, placed stationery on the ground to tip the bats forward and display them in two rows at different elevation; alternatively pulled by a handle so as to roll over the ground or allowing the same to be picked up and placed into a trunk of a vehicle with two handles.

10 Claims, 1 Drawing Sheet

BAT RACK

This invention relates to a baseball rack.

In the game of baseball, particularly as a bat boy, it is inconvenient to carry baseball bats in a duffle bag. Secondly, the bats then have to be laid out onto the field so that the players can pick up their bat when in the dugout.

I have conceived of a moveable baseball rack which can act as a portable storage device that can be moved onto the playing field by rolling, and then placed there to act as a rack displaying that is to be used by the various players.

Particularly, the movable baseball rack has the advantage of allowing a two tiered display of bats in an array so that they can be easily identified and removed from the rack when playing the game of baseball, and alternatively, the rack can be easily transported as by pulling the same since it has wheels or, lifted by front and back handle means so that it can be placed into the trunk of a vehicle and maintain the bats in an orderly fashion.

Specifically, the portable bat rack is generally shaped in the form of an equilateral triangle with larger sides of the triangular subtending the front and back of the rack while the smallest side subtends the bottom of the rack. The rack is closed at bottom and back and along the sides and carries three laterally disposed shelves, the lowest shelf being no greater than one half the width of the other two shelves, the other two shelves relatively disposed above the smallest shelf and defining a plurality of bat accomodating apertures, preferably in an array of two parallel rows, a forward and rearward row. The rearward row of openings allows bats placed therethrough to rest on the smallest shelf while the forward row of openings allows the bats to rest on the bottom. The rack includes a pair of wheels and handle means whereby it may be, on the one hand, placed stationery on the ground to tip the bats forward and display them in two rows at different elevations; alternatively pulled by a handle so as to roll over the ground or allowing the same to be picked up and placed into a trunk of a vehicle with two handled means.

The invention therefore, contemplates a portable rack for housing a plurlaty of bats in a pre-determined array comprising opposite vertical side walls, and an interconnecting back and bottom disposed between respective edges of the sidewalls and carrying three laterally extending forwardly protruding bat carrying members, each vertically disposed one from the other, the upper two bat carrying members defining an array of bat accomodating retaining means. Preferably, the sides are longer vertical incline sides and a shorter side that forms the bottom, one of the sides forming the back with a back panel and a bottom panel carrying near their respective apex, wheels, which cause the bat rack to tip forward slightly when at rest and to display the bats in an array of two rows, one elevated from the other.

The invention will now be described by way of example in reference to the accompanying drawings in which.

Figure 1:
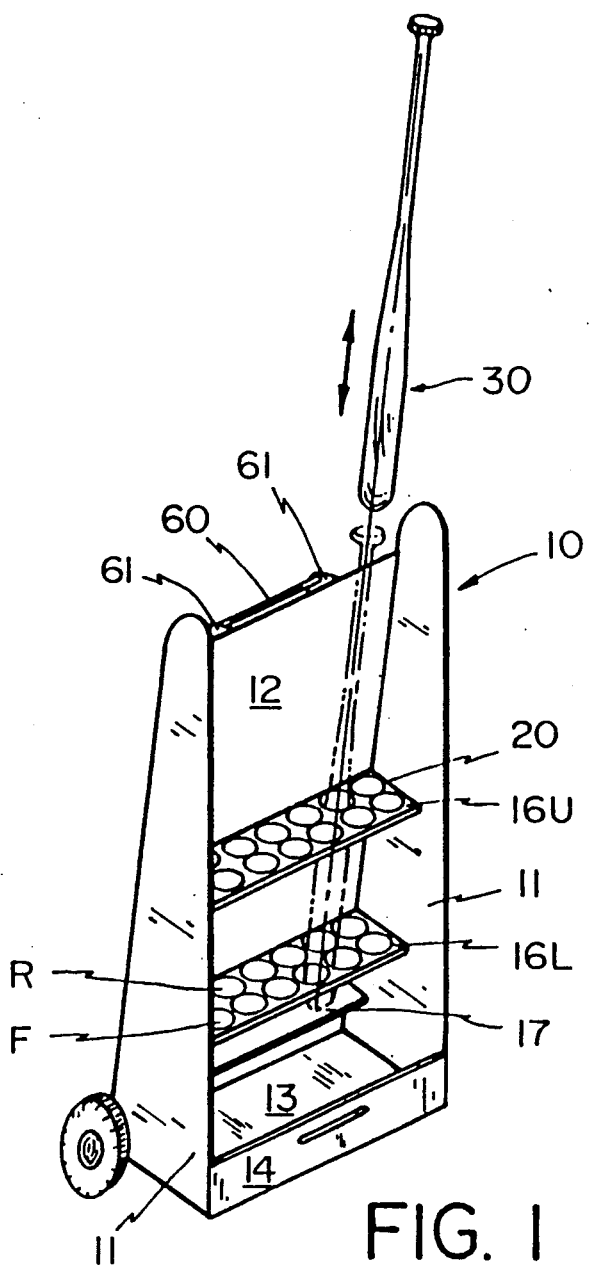
FIG. 1 is a perspective view of the rack according to the invention.

Referring to FIG. 1, the rack 10 consists of two identical side members 11 generally formed as a triangle with an upper rounded apex, a flat back sheet 12, a flat bottom sheet 13 closing off the back of the box, and a forward flat lower panel 14.

Between opposite side walls 11, projecting from back panel 12 are two relatively parallel shelves 16 oriented parallel relatively to each other and a lower shelf 17 of narrower dimension. The lower shelf 17 is solid while each of the other shelves 16U and 16L have a plurality of spacially disposed apertures 20 sized to allow a bat 30 to extend therethrough so as to form two rows of bat holding apertures, a forward row F and a rearward row R.

Figure 2:
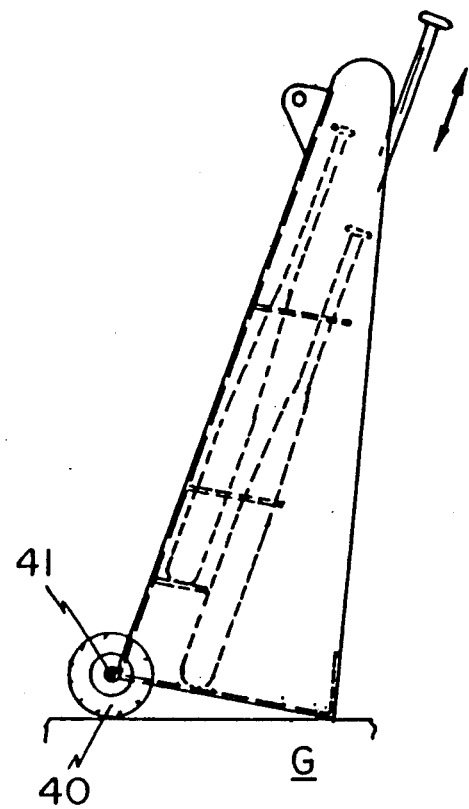
FIG. 2 is a side elevational view illustrating the two tiers of the rack.

As can be clearly seen in FIG. 2, the rearward row R of bats rests on the lowest shelf 17 while the forward row of bats F rest on the bottom panel 13 disposing the forward row of bats at an elevation lower than the rearward row.

Wheels 40 are attached to the rack 10 by means of axle bolt 41 anchored into the bottom rear apex of each of the end triangles. Preferably, the angle between the back 12 and the bottom 13 forms an acute angle of 75°. In this manner, when the rack is in its resting position shown in FIGS. 1 or 2, the rack tilts slightly forward as more clearly seen in the side elevational FIG. 2.

Figure 3:
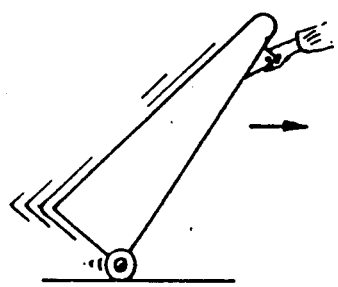
FIG. 3 is a side elevational view showing the rack in transit.

For transport, and now referring to FIG. 3, the rack is tipped backward and pulled in the direction of the arrow shown in that figure. In that respect, from the upper portion of the back of the rack and preferably in the center thereof, is a horizontal handle bar 60 secured to protruding end member 61 that are affixed to the rear surface of the back. This handle 60 allows the back to be transported as shown FIG. 3 but also, in concert with the forward slotted recess S in vertical lower front panel 14 to "pick-up" the total rack so that it can be placed into a trunk of a vehicle.

I have found that convenient dimensions for the above is that the vertical triangular sides of ends 11 should have a length of approximately 41" while the bottom side, a length of around 15". The wheels 40 have a diameter of approximately 6" while the bottom shelf 17 is spaced at a distance 6" from the bottom panel 13 and having a width of approximately 3" while the other shelves 16 respectively have widths of 7" and are disposed from each other and from the bottom 12".

I claim:

1. A portable rack for housing a plurality of baseball bats in a pre-determined array comprising:
    (a) opposite vertical triangular side walls, with upper, lower-rear and lower-forward, apexes, a back and bottom interconnecting and disposed between respective back and bottom edges of the side walls, the side walls carrying at least three rigid laterally extending forwardly protruding bat carrying members, each vertically and spatially disposed one from the other, the upper two bat carrying members each defining an array of bat accomodating retaining means wherein the upper two carrying members define orifaces through which the bats extend, the orifices arranged in at least two rows, a forward and rearward row, and means for holding the bats in a rearward row at an elevation higher than the bats in a forward row, a bottom flat sheet extending forward from near the lower-rear apex toward the lower-forward apex, and wheel members mounted in closer proximity to the lower-rear apex than the lower-forward apex so as to permit the lower-forward apexes, when the rack is in the standing and used position, to engage the ground and with the wheels to tilt the rack forward.

2. The portable rack as claimed in claim 1 including means for carrying the rack.

3. The portable rack as claimed in claim 1 including handle means near the bottom thereof and near the upper apex.

4. The portable rack as claimed in claim 1 wherein a handle means is mounted on the rear surface of the upper back in proximity to the apex.

5. The portable rack as claimed in claim 2 wherein a handle means is mounted on the rear surface of the upper back in proximity to the apex.

6. The portable rack as claimed in claim 3 wherein a handle means is mounted on the rear surface of the upper back in proximity to the apex.

7. The portable rack as claimed in claim 1, wherein the upper two rigid bat carrying member define families of apertures through which bats extend.

8. The rack as claimed in claim 7, wherein the depth of the lowest forwardly protruding bat carrying member has no aperture and is adapted to act as a rest for bats disposed through apertures superadjacent thereto so that the rear family of apertures disposes the bat handle at an elevation higher than that of a forward family of apertures.

9. The rack as claimed in claim 1, wherein the lower-rear apex is a right angle.

10. The rack as claimed in claim 9, wherein the shortest dimension of the triangular sides is the bottom margin of the rack.

* * * * *